(12) United States Patent
Gordin et al.

(10) Patent No.: US 8,537,021 B1
(45) Date of Patent: Sep. 17, 2013

(54) APPARATUS, METHOD, AND SYSTEM FOR IMPROVED CONTROL AND MONITORING OF ELECTRICAL SYSTEMS

(75) Inventors: Myron Gordin, Oskaloosa, IA (US); Jeffrey A. Jacobson, Schaumburg, IL (US); Darrell N. Chelcun, West Dundee, IL (US); Timothy D. McGill, Pleasantville, IA (US); Alan W. Sheldon, Pella, IA (US)

(73) Assignee: Musco Corporation, Oskaloosa, IA (US)

( * ) Notice: Subject to any disclaimer, the term of this patent is extended or adjusted under 35 U.S.C. 154(b) by 357 days.

(21) Appl. No.: 12/879,589

(22) Filed: Sep. 10, 2010

Related U.S. Application Data

(60) Provisional application No. 61/243,093, filed on Sep. 16, 2009, provisional application No. 61/243,835, filed on Sep. 18, 2009, provisional application No. 61/242,230, filed on Sep. 14, 2009, provisional application No. 61/243,086, filed on Sep. 16, 2009.

(51) Int. Cl.
*G08B 21/00* (2006.01)
*H02H 3/16* (2006.01)

(52) U.S. Cl.
USPC ........... 340/635; 340/649; 340/650; 340/657; 361/42; 361/44

(58) Field of Classification Search
USPC ............. 340/539.1, 539.11, 635, 650, 651, 340/653, 657, 661, 664, 870.02, 3.1, 649; 315/159, 160, 175, 242; 307/3, 17, 54, 66; 200/50.33; 700/291, 295; 702/182, 188; 361/42, 44, 93.2
See application file for complete search history.

(56) References Cited

U.S. PATENT DOCUMENTS

| | | | |
|---|---|---|---|
| 4,994,718 A | 2/1991 | Gordin | |
| 5,023,519 A * | 6/1991 | Jensen | 315/242 |
| 5,880,677 A * | 3/1999 | Lestician | 340/3.1 |
| 6,122,603 A * | 9/2000 | Budike, Jr. | 702/182 |
| 6,311,105 B1 * | 10/2001 | Budike, Jr. | 700/291 |
| 6,681,110 B1 | 1/2004 | Crookham et al. | |
| 7,046,882 B2 | 5/2006 | Kline | |
| 7,176,635 B2 | 2/2007 | Gordin et al. | |
| 7,358,681 B2 | 4/2008 | Robinson et al. | |
| 7,982,404 B2 | 7/2011 | Gordin | |
| 8,163,993 B2 | 4/2012 | Gordin et al. | |
| 8,222,548 B2 * | 7/2012 | Espeut, Jr. | 200/50.33 |
| 8,247,990 B1 | 8/2012 | Gordin et al. | |
| 8,320,089 B1 | 11/2012 | Chelcun et al. | |
| 2011/0007443 A1 | 1/2011 | Crookham et al. | |
| 2011/0121654 A1 * | 5/2011 | Recker et al. | 307/66 |
| 2011/0133655 A1 * | 6/2011 | Recker et al. | 315/159 |

* cited by examiner

*Primary Examiner* — Van T. Trieu
(74) *Attorney, Agent, or Firm* — McKee, Voorhees & Sease, P.L.C.

(57) ABSTRACT

Apparatus, methods, and systems for providing comprehensive control and monitoring of an electrical system are presented. The envisioned invention according to at least one aspect provides for control and monitoring functions that include main circuit level functions and sub-circuit level functions. The control and monitoring function further provides for communication with a remote central control center to send commands to and receive data from the main circuit control and/or sub-circuit(s). Information from the monitoring function may be used to alter the operation of the system, aid in diagnostic response, and ultimately, improve the safety and reliability of the electrical system.

29 Claims, 11 Drawing Sheets

APPARATUS, METHOD, AND SYSTEM FOR IMPROVED CONTROL AND MONITORING OF ELECTRICAL SYSTEMS

CROSS-REFERENCE TO RELATED APPLICATIONS

This application claims priority under 35 U.S.C. §119 to provisional U.S. application Ser. No. 61/243,093, filed Sep. 16, 2009, hereby incorporated by reference in its entirety.

This application claims priority under 35 U.S.C. §119 to provisional U.S. application Ser. No. 61/243,835, filed Sep. 18, 2009; provisional U.S. application Ser. No. 61/243,086, filed Sep. 16, 2009; and provisional U.S. application Ser. No. 61/242,230, filed Sep. 14, 2009, each of which is hereby incorporated by reference in its entirety.

This application claims the benefit under 35 U.S.C. §120 to

| Ser. No. | Filing Date | Now | Filing Date |
|---|---|---|---|
| 61/201,066 | Dec. 5, 2008 | 12/534,504 | Aug. 3, 2009 |
| 61/201,065 | Dec. 5, 2008 | 12/559,863 | Sep. 15, 2009 |
| 61/169,921 | Apr. 16, 2009 | 12/750,387 | Mar. 30, 2010 |
| 61/169,930 | Apr. 16, 2009 | 12/750,377 | Mar. 30, 2010 |
| 61/224,370 | Jul. 9, 2009 | 12/833,544 | Jul. 9, 2010 |
| 61/242,230 | Sep. 14, 2009 | 12/869,802 | Aug. 27, 2010 |
| 61/243,086 | Sep. 16, 2009 | 12/850,334 | Aug. 4, 2010 |

I. BACKGROUND OF THE INVENTION

The present invention generally relates to means and methods of controlling and monitoring electrical systems and the circuits therein. More specifically, the present invention relates to monitoring an electrical system and the components and circuits therein, processing and analyzing the monitored data, and controlling operation of the electrical system in response to the analyzed data to improve operator safety and maintain system reliability.

The most basic of needs for a user of an electrical system is the need to turn the system (or circuit therein) on and off. Satisfying this need can be as simple as providing a manually operated switch or can be as complex as providing an automated control system with a feedback loop from a sensor-type device, for example. Often, more complex control systems include additional functions; one example is an interface that allows a user to establish operating profiles (e.g., on/off schedules), monitor various operating parameters (e.g., voltage), or otherwise. Another example of a basic need for a user of an electrical system is the need to operate the electrical system remotely (e.g., to minimize the cost associated with maintaining on-site staff).

While there are commercially available systems which allow a user to both monitor the operation of an electrical system remotely and facilitate on/off control, these systems do not address what is becoming an increasingly important need: the ability to recognize undesirable conditions and to make changes to the electrical system in real time to address those conditions before they become hazardous to persons or equipment or otherwise compromise the integrity of the electrical system. The art would benefit from a comprehensive approach to controlling and monitoring an electrical system; an approach that not only addresses the basic needs of operating the system but through improved controlling and monitoring means and methods ensures the electrical system is safer (e.g., by minimizing electrical shock hazards) and more reliable (e.g., by ensuring a defined operating condition is met) when compared to similar electrical systems in the current state of the art. Thus, there is room for improvement in the art.

II. SUMMARY OF THE INVENTION

Envisioned are means and methods for monitoring various functions and parameters of an electrical system, and means and methods for effectuating changes in said functions and parameters according to some defined threshold, governing code, user preference, or otherwise. For example, according to one aspect of the invention the electrical system comprises a wide-area outdoor sports lighting system, the parameter being monitored is leakage current, and the means and methods of effectuating change is a ground fault circuit interrupter (GFCI)-type device which disables power to the errant circuit according to Underwriters Laboratories (UL) standards. However, this is according to only one aspect of the invention; it is the sum of the control and monitoring functions that occur simultaneously that provides an overall assessment of the "health" of the electrical system in real time and remotely, if desired.

It is therefore a principle object, feature, advantage, or aspect of the present invention to improve over the state of the art and/or address problems, issues, or deficiencies in the art.

Further objects, features, advantages, or aspects of the present invention may include one or more of the following:
  a. providing on/off control of the main circuit power;
  b. providing on/off control of the sub-circuit power independently of the main circuit power;
  c. monitoring one or more operating parameters of one or more sub-circuits, the main circuit, or both, including, but not limited to:
      i. voltage;
      ii. current;
      iii. power consumption;
      iv. light output (or analogous parameter for a non-lamp load);
      v. electrical grounding; and
      vi. efficiency;
  d. communicating one or more instructions between a local control system, the main circuit, and one or more sub-circuits including, but not limited to:
      i. adjusting power;
      ii. identifying impending or actual undesirable conditions;
      iii. mitigating undesirable conditions;
      iv. activating a warning system;
      v. storing and/or processing data;
      vi. storing and/or activating operating profiles; and
  e. providing a comprehensive control and monitoring system that serves to:
      i. help ensure the safety of persons in proximity to the electrical system;
      ii. ensure correct operation and reliability of the electrical system;
      iii. is adapted for remote operation; and
      iv. may be retrofitted to existing electrical systems.

These and other objects, features, advantages, or aspects of the present invention will become more apparent with reference to the accompanying specification and claims.

III. BRIEF DESCRIPTION OF THE DRAWINGS

From time-to-time in this description reference will be taken to the drawings which are identified by figure number and are summarized below.

FIGS. 1A-D illustrate a typical wide-area outdoor sports lighting system. FIG. 1A illustrates an overview of the lighting system. FIG. 1B illustrates a partial block diagram of the electrical components in FIG. 1A. FIG. 1C illustrates one typical method of power wiring for the plurality of lamps affixed to Pole A in FIG. 1A. FIG. 1D illustrates one typical method of stacking electrical components in enclosures affixed to Pole A in FIG. 1A.

FIG. 2 illustrates in block diagram form the control enclosure of FIGS. 1A-D modified to include control and monitoring functionality according to an aspect of the present invention.

FIGS. 3A-D illustrate the equipment enclosures of FIGS. 1A-D modified to include control and monitoring functionality according to an aspect of the present invention. FIG. 3A illustrates in block diagram form the functionality of components housed in three equipment enclosures for operation with twelve lamps. FIG. 3B illustrates two possible methods of wiring the voltage module and power line gateway components of FIG. 3A for three-phase power. FIG. 3C illustrates one possible method of wiring the diagnostic module of FIG. 3A for connection on the common side of the ballast. FIG. 3D illustrates modification of the equipment layout illustrated in FIG. 1D according to an aspect of the present invention.

IV. DETAILED DESCRIPTION OF EXEMPLARY EMBODIMENTS

A. Overview

Figure 1A:
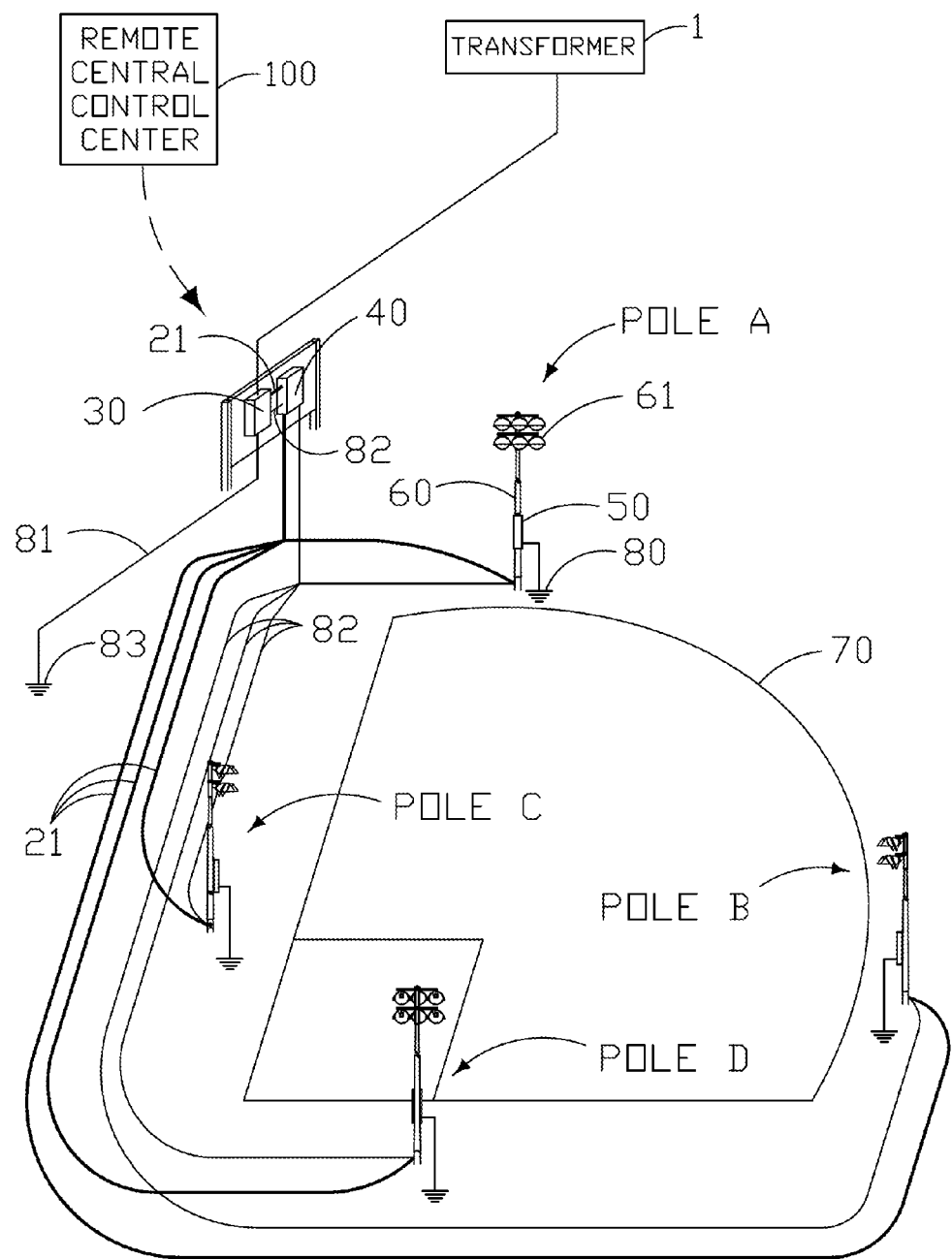
Figure 1B:
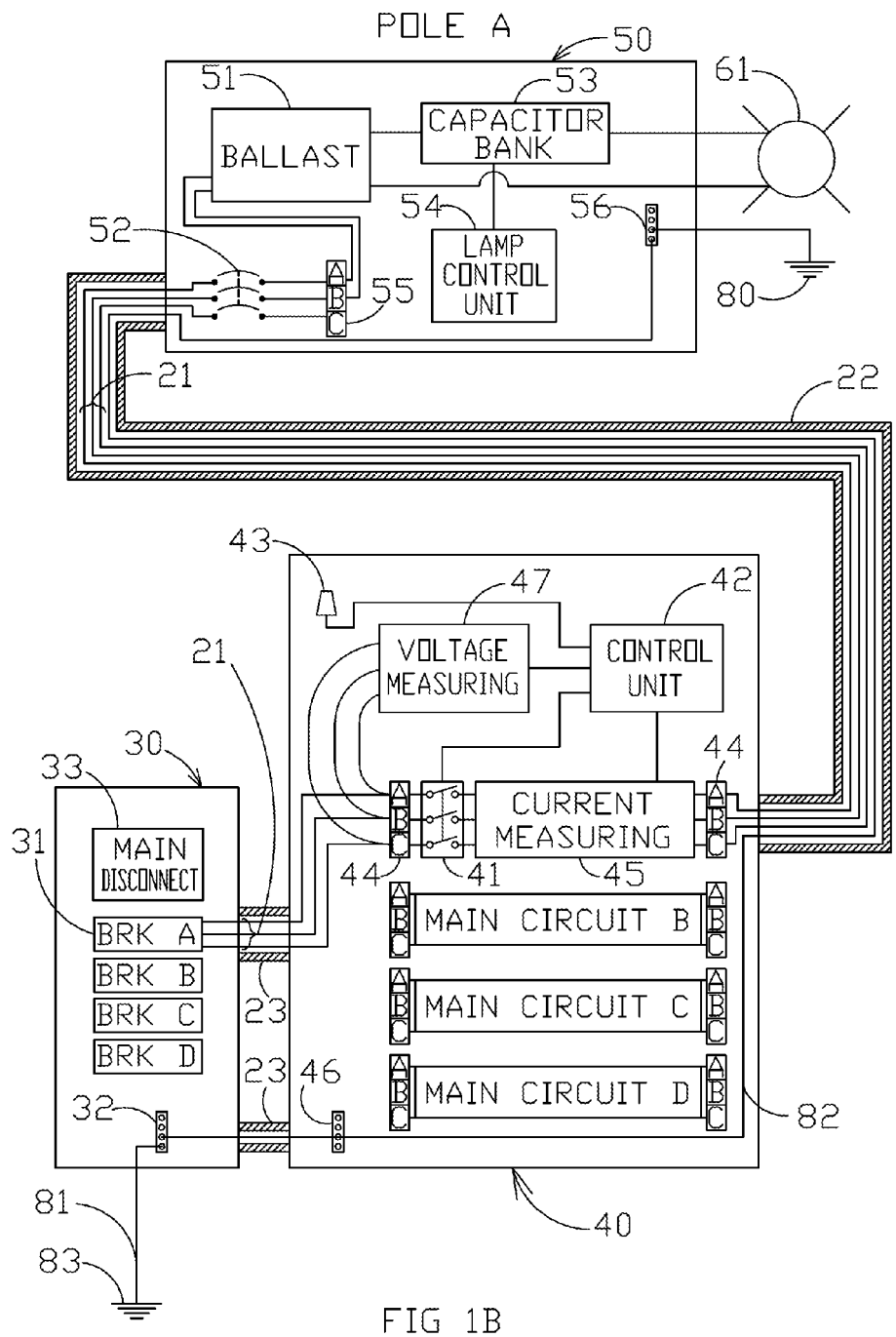

To further an understanding of the present invention, specific exemplary embodiments according to the present invention will be described in detail. Frequent mention will be made in this description to the drawings. Reference numbers will be used to indicate certain parts in the drawings. The same reference numbers will be used to indicate the same parts throughout the drawings.

The exemplary embodiments disclose means and methods of monitoring and controlling an electrical system so to improve the reliability and safety of the system; in particular, high voltage electrical systems with widely distributed equipment, though this is by way of example and not by way of limitation. One electrical system which may benefit from aspects of the invention is an outdoor sports lighting system such as that illustrated in FIGS. 1A-D, and is generally characterized according to the following.

1. Power Distribution

As can be seen from FIGS. 1A-D, a sports field 70 is illuminated by a plurality of high intensity discharge (HID) luminaires 61 (sometimes referred to as a light, lights, or light source) elevated on and affixed to poles 60 which are distributed about field 70. Power to lights 61 is distributed from a control enclosure 40 and service enclosure 30 and may generally be characterized according to the following.

Figure 1C:
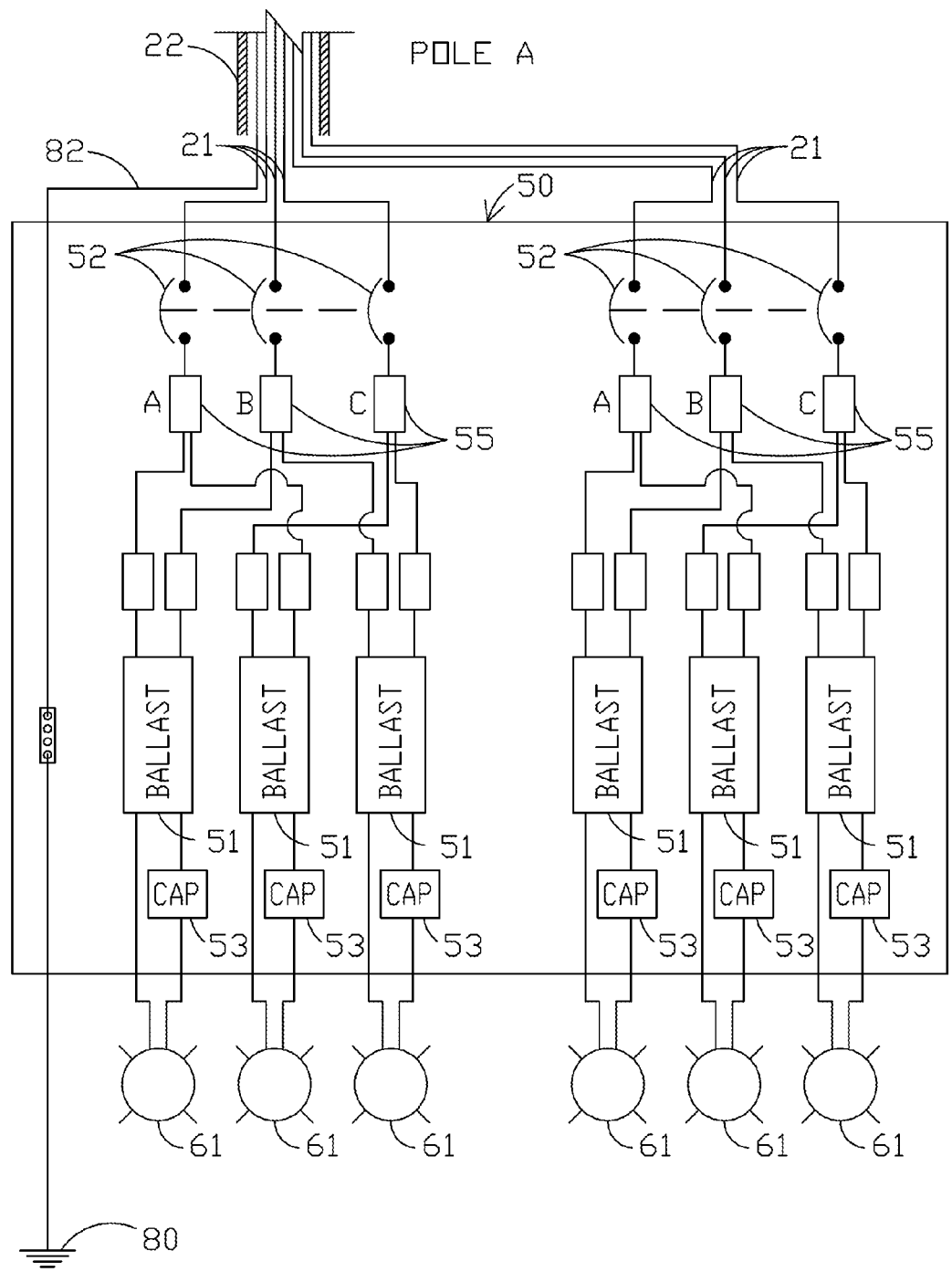
Figure 1D:
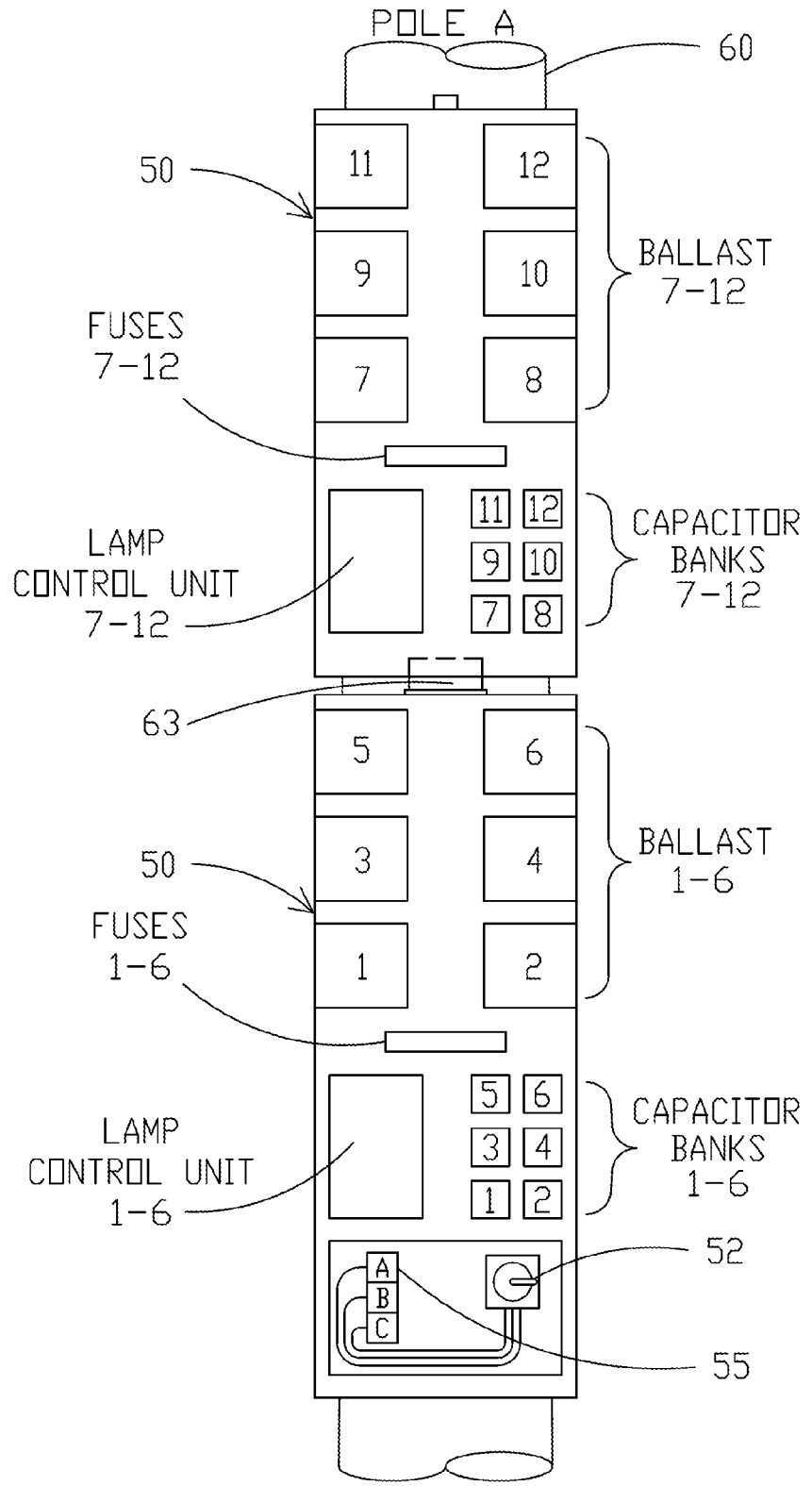

1. A transformer 1 delivers power from a provider (e.g., utility company) to the site.
   a. For a system such as that illustrated in FIGS. 1A-D incoming power is typically three-phase 480 VAC with 200-400 amperage capacity, though incoming power may be tailored to suit an anticipated load.
2. Power from transformer 1 reaches service enclosure 30 and is distributed from a breaker 31 to a distribution block 44 (sometimes referred to a as a contactor module) for each circuit via power lines 21.
   a. It is of note that for the sake of brevity FIG. 1B only illustrates a complete circuit from breaker A 31 to a single luminaire 61 housed at Pole A of FIG. 1A; one of average skill in the art would know similar circuits exist for equipment at Poles B-D.
3. On-site control of power is enabled by a control unit 42 which, either by local or remote instruction, controls the operation of contactors 41 for each main circuit.
   a. Local instruction to control unit 42 could be provided via a manually operated member (e.g., switch).
   b. Remote instruction to control unit 42 could be provided via a remote central control center 100 (see FIG. 1A) which is in communication with control unit 42 via an antenna 43 or analogous device for the appropriate mode of communication (e.g., infrared, radio, cellular signal, satellite, etc.).
4. Power continues along power lines 21 from control enclosure 40 to one or more equipment enclosures 50 distributed about field 70 and which house load-specific equipment; in this example, ballasts 51, capacitor banks 53, and fuses (see FIG. 1D) for each luminaire 61 as well as a lamp control unit 54. Power to an individual equipment enclosure 50 may be terminated at a disconnect switch 52.
   a. A typical method of routing power lines 21 to a plurality of luminaires 61 via distribution blocks 55 is illustrated in FIG. 1C.
   b. A typical layout of the components in enclosure 50 is illustrated in FIG. 1D; in this example, for a pole 60 housing twelve luminaires 61. As can be seen, components are grouped together for each circuit, each enclosure 50 connected via a conduit 63; U.S. patent application Ser. No. 12/862,040 incorporated by reference herein describes possible conduits.

2. Electrical Grounding

Typically, some degree of grounding is provided for the components of any outdoor electrical system (e.g., to provide a low impedance path to ground in the event of a lightning strike). For the lighting system illustrated in FIGS. 1A-D, service enclosure 30 is grounded via an equipment ground electrode 83 and ground wire 81 which lands at terminal 32. Likewise, each equipment enclosure 50 is grounded via an earth ground electrode 80 and equipment ground wire 82 which travels from electrode 80 to terminal 56 at equipment enclosure 50, to terminal 46 at control enclosure 40, then to terminal 32 at service enclosure 30. Equipment ground wire 82 could be run in a conduit separate from power lines 21 (as in conduit 23) or in a conduit with power lines 21 (as in conduit 22).

It is of note that grounding electrodes as described herein need not be a conductive rod driven into the ground; U.S. patent application Ser. No. 12/709,991, issued as U.S. Pat. No. 8,163,993 on Apr. 24, 2012 and incorporated by reference herein, discusses some means and methods of providing grounding for an outdoor elevated structure (e.g., pole 60) which include alternatives to driven rods.

3. Light Output

Beyond the basic need to turn an electrical system on or off, there is often a need to provide intermediate power levels which correlate to some output level of the load; in this example, adjusting power to each circuit will create a corresponding adjustment to the light output of the luminaires in that circuit (i.e., reducing power will dim the lights), U.S. Pat. No. 4,994,718 incorporated by reference herein discusses power adjustments as a means to affect light output for ballasted lamp circuits such as those illustrated in FIGS. 1A-D. Similarly, for lighting systems such as that illustrated in FIGS. 1A-D, there is also a need to make power adjustments to compensate for lumen depreciation; U.S. Pat. No. 7,176,635 incorporated by reference herein discusses the phenomenon of lumen depreciation and means and methods for compensating for lumen depreciation to maintain a desired light level.

Means and methods for facilitating power changes in the lighting system illustrated in FIGS. 1A-D to produce a desired light output (e.g., to compensate for lumen depreciation, provide a lower light level for practice, provide a higher light level for tournament play, etc.) may generally be characterized according to the following.

1. Instruction from remote central control 100 (e.g., via antenna 43) or from a local input (e.g., from an on/off switch or high/medium/low (HML) switch) to adjust the power level to luminaires 61 is received at control unit 42.
   a. Typically, control unit 42 is adapted to receive multiple instructions to be enacted over a predetermined time (e.g., control unit 42 may store on/off schedules for a week of activities at field 70).
2. Control unit 42 distributes power adjustment instructions to each distributed equipment location (e.g., each pole 60 about field 70) via power line carrier communication (PLCC).
   a. PLCC has the benefit of using the existing system infrastructure (i.e., power lines 21) to facilitate two-way communication between components distributed about the site; however, other modes of communication are possible.
3. Each distributed location receives power adjustment instructions which are executed by lamp control units 54; as is illustrated in FIG. 1D, a distributed location may contain more than one lamp control unit 54, each lamp control unit 54 capable of controlling one or more luminaires 61.
   a. Means of executing power adjustment instructions can include a variety of mechanisms designed to switch taps on ballasts 51 or switch capacitors of capacitor banks 53 in and out of the circuit; aforementioned U.S. Pat. No. 7,176,635, U.S. patent application Ser. No. 11/932,560 (issued as U.S. Pat. No. 7,982,404 on Jul. 19, 2011), U.S. patent application Ser. No. 12/534,504 (issued as U.S. Pat. No. 8,247,990 on Aug. 21, 2012), and U.S. patent application Ser. No. 12/329,949, all of which are incorporated by reference herein, discuss some possible mechanisms.

It is possible for power adjustment instructions to be communicated and executed in different ways according to equipment capability, user preference, or otherwise. For example, in the current state of the art it is not uncommon for lamp control unit 54 to further comprise a timer function so that incremental power changes to compensate for lumen depreciation occur automatically; this would not prevent lamp control unit 54 from also receiving instructions from control unit 42 to reduce power (e.g., as facilitated by an HML switch).

4. Remote Monitoring

Remote control of the lighting system illustrated in FIGS. 1A-D may be enabled by remote central control center 100 and may include continuous, on demand, or scheduled monitoring of, but not limited to:
   current at the main circuit level via current measuring module 45;
      Typically, measuring module 45 measures the total amperage on each phase of the circuit and communicates the measurement to remote central control center 100 where it may be compared to a baseline measurement or other threshold (e.g., to determine if a significant event such as a lamp outage has occurred). Alternatively, the comparison to a baseline measurement or other threshold could occur at control unit 42; if desired, the result could then be communicated to remote center 100.
      Typically, there is one current measuring module 45 per main circuit; in this example, each current measuring module 45 comprises three current transformers (one for each phase).
   line voltage at control enclosure 40 via voltage measuring module 47; and
      Typically, measuring module 47 measures the voltage prior to contactors 41 and communicates measurements to remote central control center 100 (e.g., so measurements may be taken when lights 61 are off).
      There could be a single voltage measuring module 47 the measurement therefrom applied to all the main circuits, or each main circuit could have its own voltage module 47.
   feedback status of contactor position (e.g., to ensure power instructions are executed correctly).
      U.S. patent application Ser. No. 12/869,802 incorporated by reference herein discusses the design of a rapid response, high current contactor assembly which includes a feedback circuit.

An example of a remote central control center and control and monitoring of a lighting system therefrom is discussed in U.S. Pat. No. 6,681,110 incorporated by reference herein and commercially available under the trade name CONTROL-LINK® from Musco Lighting, LLC, Oskaloosa, Iowa, USA. As may be appreciated by one skilled in the art, the commercially available CONTROL-LINK® product may differ from that described in U.S. Pat. No. 6,681,110 as the preferred mode of communication between an on-site component and a central server discussed in said patent (e.g., analog cellular signal) may comprise alternate modes of communication (e.g. satellite, Global System for Mobile communications (GSM), Code Division Multiple Access (CDMA), etc.).

B. Exemplary Method and Apparatus Embodiment 1

A more specific exemplary embodiment, utilizing aspects of the generalized example described above, will now be described. The apparatus, methods, and systems described herein relate to control and monitoring of a wide-area outdoor lighting system such as previously described, generally comprising high-wattage HID light sources rated for operation at 1000 watt or greater, though this is by way of example and not by way of limitation. Other types of electrical systems may also benefit from aspects of the present invention.

Figure 2:
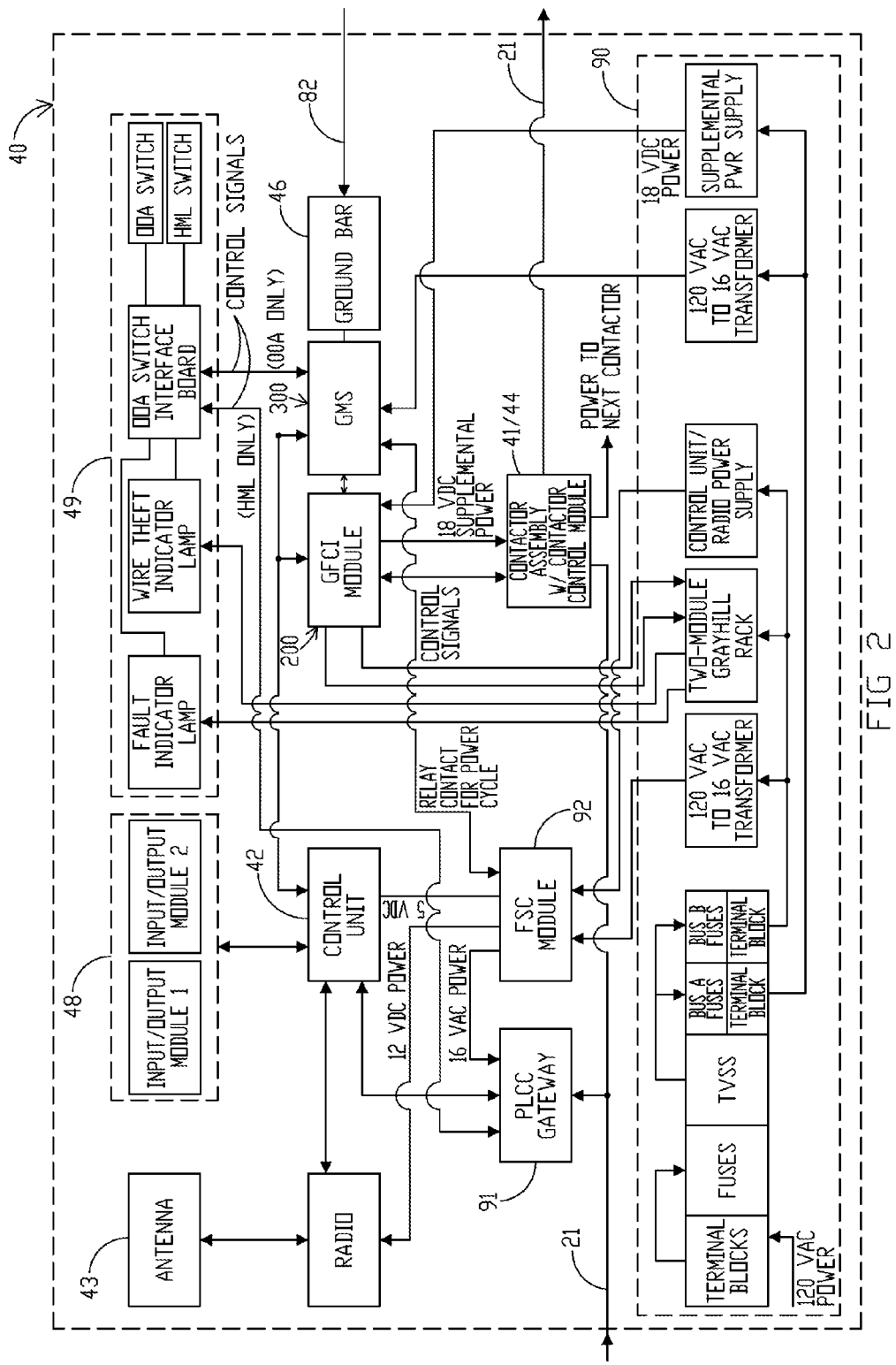
Figure 3A:
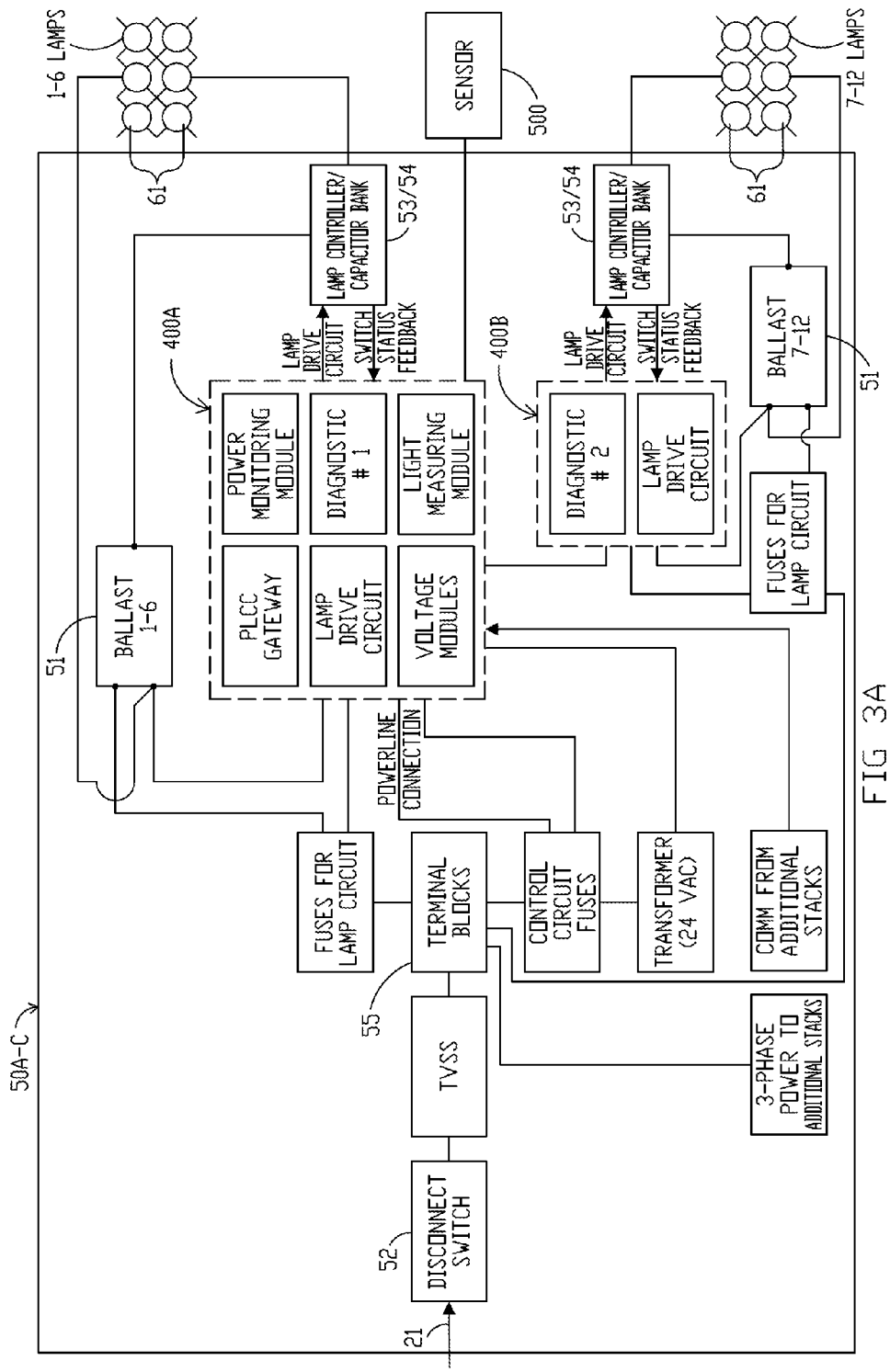
Figure 3B:
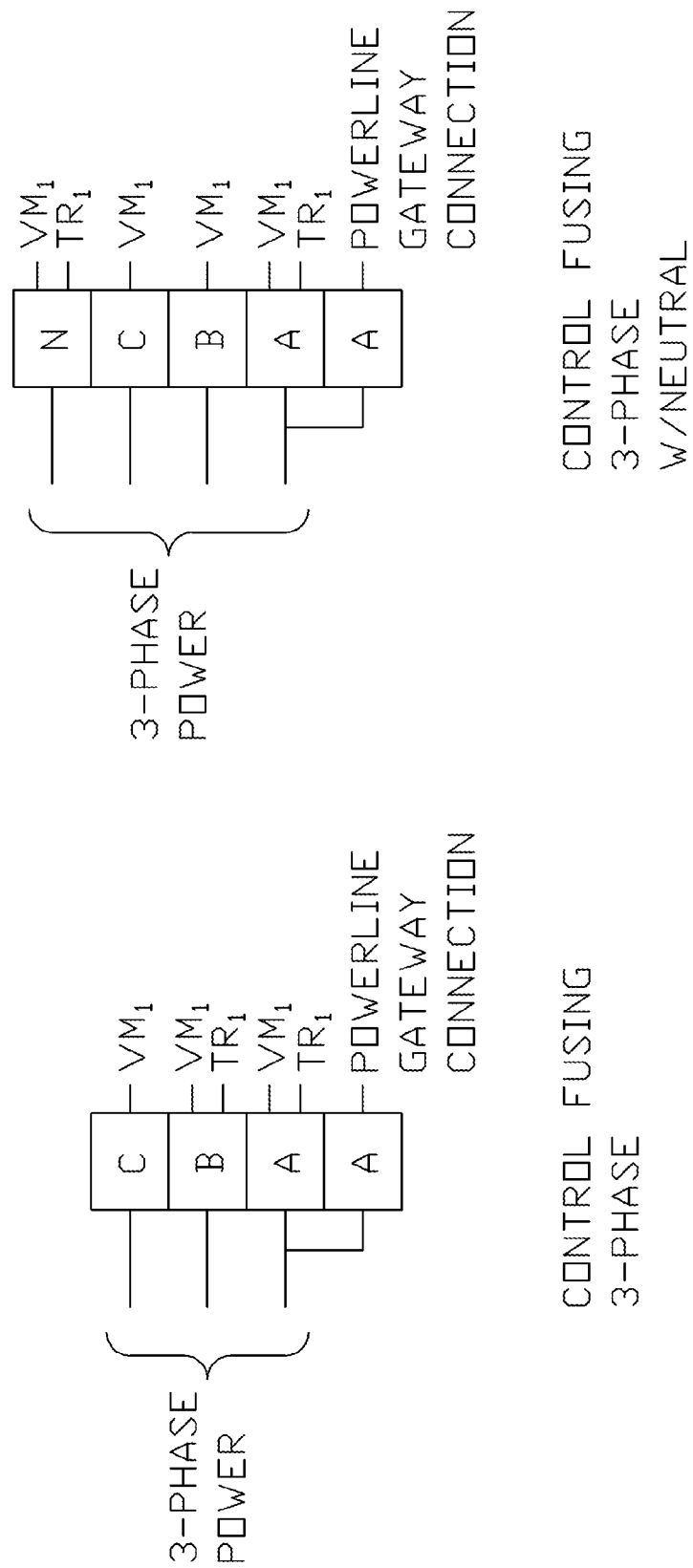
Figure 3C:
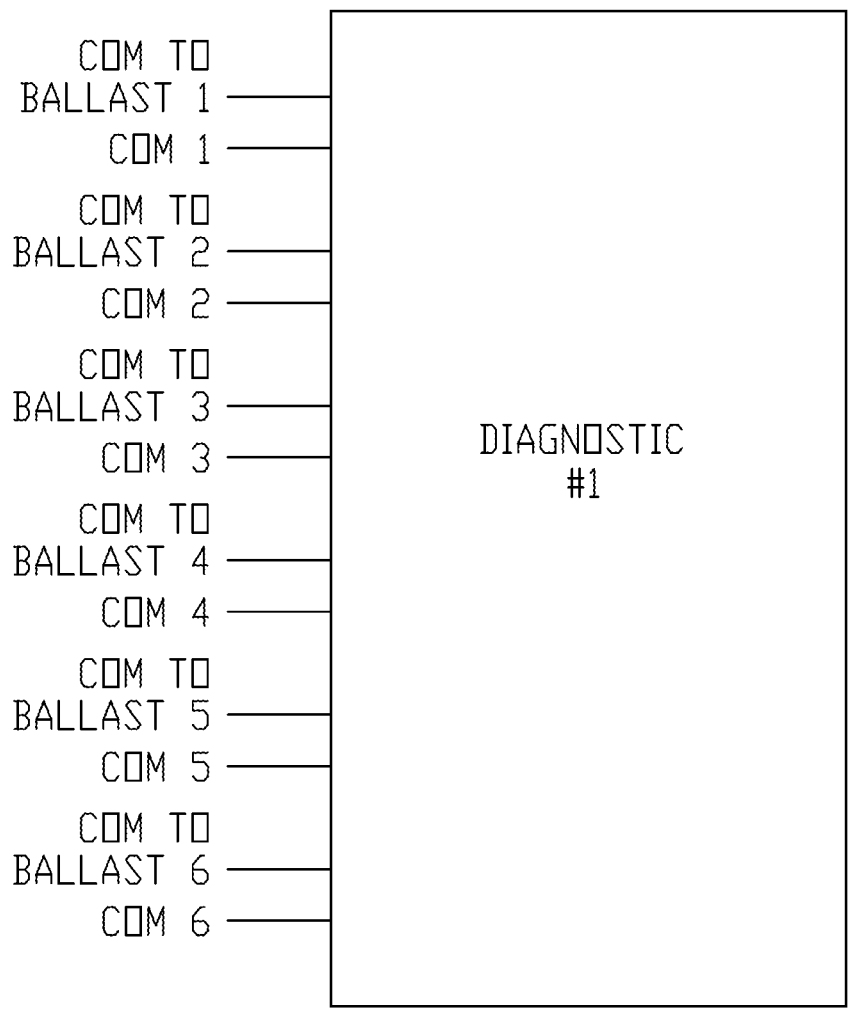
Figure 3D:
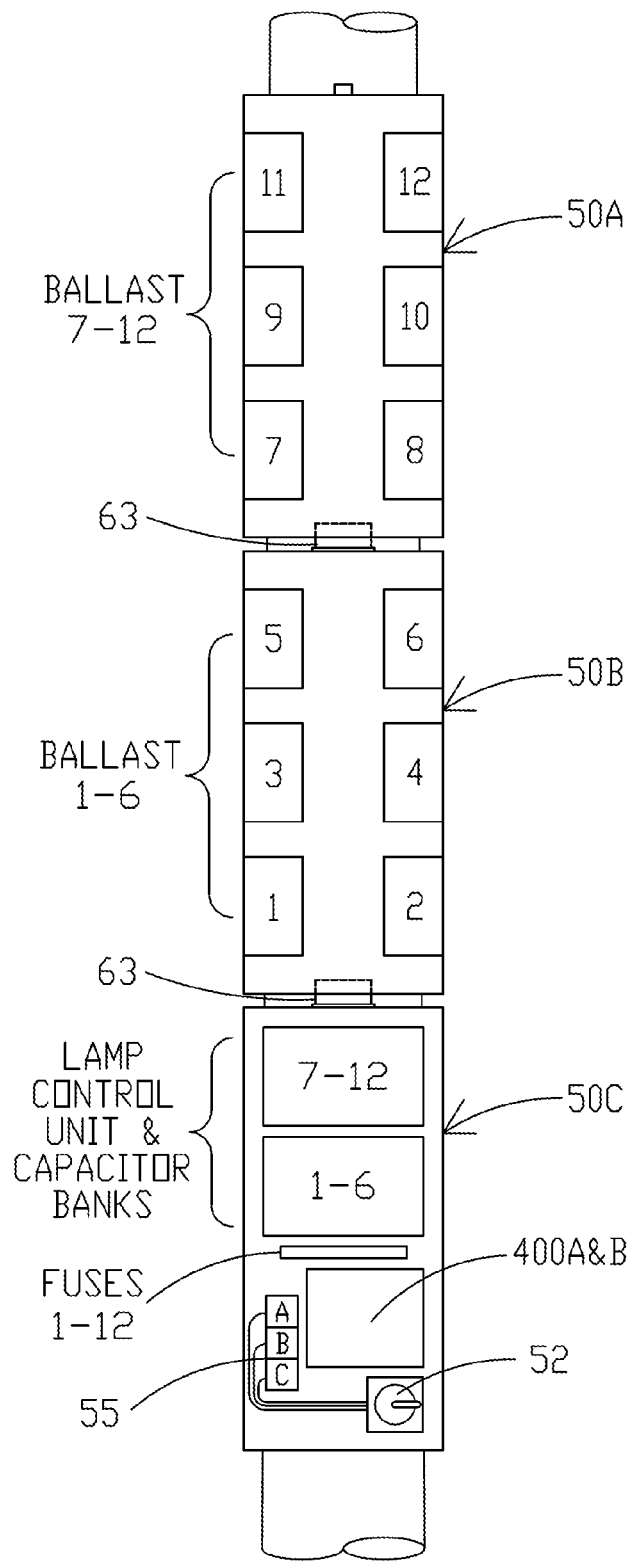

Modification of the lighting system illustrated in FIGS. 1A-D to provide a comprehensive control and monitoring system with functions at both the main and sub-circuit levels is illustrated in FIGS. 2-3D, and may be characterized according to the following.

1. Power Distribution

As previously stated, power delivered to the site via transformer 1 is distributed to main circuits via breakers 31 in service enclosure 30 and distribution blocks 44 in control enclosure 40. Power at the main circuit level is further distributed to one or more sub-circuits at equipment enclosures 50 via distribution blocks 55, each sub-circuit including one or more luminaires 61. Generally, equipment associated with control and monitoring functions at the main circuit level is housed in control enclosure 40 (see FIG. 2) and equipment associated with control and monitoring functions at the sub-circuit level is housed in equipment enclosure 50 (see FIGS. 3A-D).

This configuration provides significant flexibility in the regulation of power in the system. For example, power to the entire lighting system could be terminated at main disconnect 33, power to an entire main circuit could be terminated at contactors 41 or disconnect switch 52, or power to a single sub-circuit could be adjusted at master control device 400A. As another example, power may be regulated (i.e., terminated, initiated, and/or adjusted) remotely via remote central control center 100, locally via user interface 49, or both. As another example, power may be regulated according to a predetermined schedule, on demand, in response to an event, or otherwise. As described and illustrated herein, control and monitoring functions at both the main and sub-circuit levels permits not only tailored control of power, but also aids in diagnosing both the nature and location of a fault condition (e.g., via improved resolution of data and the ability to isolate sub-circuits for testing).

a. Control Enclosure 40

The envisioned control and monitoring system requires power distribution in and of itself which is provided via power distribution 90 which generally comprises:

120 VAC power delivered to terminal blocks by service enclosure 30;
fuses for overcurrent protection;
a transient voltage surge suppressor (TVSS);
fusing, terminal block, and transformer to provide power to a GFCI module 200 and a ground monitoring system (GMS) module 300;
   The supplemental power supply of power distribution 90 drives the coils of contactors 41 which have been modified to conform to UL defined response times for GFCI devices (see, e.g., U.S. application Ser. No. 12/869,802), though this is by way of example and not by way of limitation. GFCI module 200 and GMS module 300 are discussed in further detail in the section addressing electrical grounding.
fusing, terminal block, and transformer to provide power to a fail-safe circuit (FSC) module 92, control unit 42, and a radio; and
   FSC module 92 is designed to reboot or reset system power if any of the processors inherent to the illustrated equipment fails to respond (e.g., if equipment locks up during bios loading) or in accordance with some known event (e.g., when new firmware is received by control unit 42).
equipment to provide power to a user interface 49.
   As envisioned, local interface 49 comprises a switch or analogous device by which a user on site may facilitate manual on/off control of lights 61 or enable automatic control by remote central control center 100 (e.g., via an OOA switch), a switch or analogous device by which a user on site may select different degrees of lighting intensity (e.g., via a HML switch), and one or more visual indicators (e.g., light emitting diodes) to indicate a fault condition, theft of grounding wire, etc.
   The activation of visual indicators in local interface 49 may be directed by a solid state relay or analogous device (e.g., the two-module grayhill rack module of power distribution 90).

In practice, control unit 42 is the router of power distribution functions at control enclosure 40. For example, assume a user on site wants to dim the lights on field 70 during a team practice so to save on operating costs. The user changes the setting on the HML switch of user interface 49 from high to medium; this setting change is communicated to control unit 42. Control unit 42 sends the power adjustment command to master control devices 400A (see FIG. 3A) at each equipment enclosure 50 via PLCC gateway 91 and may communicate the power change back to remote central control center 100 via antenna 43.

As another example, assume remote central control 100 sends a series of on/off commands to control unit 42 (e.g., a week's worth of on/off schedules in accordance with a summer league); it is of note that on/off schedules could also be downloaded to control unit 42 directly via an appropriate device such as laptop computer (see reference no. 48). At the appropriate time (e.g., as determined by a timer function inherent to control unit 42) control unit 42 communicates an "on" command to contactor assembly 41/44 via GFCI module 200, the feedback circuit inherent to GFCI module 200 communicates a contactor status feedback to control unit 42, and control unit 42 may communicate the status back to central control 100. If the feedback circuit does not result in an indication of a closed contact, control unit 42 could send another "on" command, FSC module 92 could reboot GFCI module 200, the fault indicator could illuminate, control unit 42 could send an alarm signal to central control 100, or otherwise.

b. Equipment Enclosure 50

Power from control enclosure 40 is distributed at equipment enclosure 50 to each sub-circuit; generally, each sub-circuit comprises a ballast 51, capacitor bank 53, luminaire 61, and lamp control unit 54. As envisioned and is illustrated in FIGS. 3A and D, a controller 54 and capacitor bank 53 may be shared for up to six luminaires 61; however, this is by way of example and not by way of limitation. For example, if physical space and cost were less important than the ability to control each of the twelve lights 61 individually, a controller 54 and capacitor bank 53 could be provided for each light 61.

The envisioned control and monitoring equipment housed at enclosures 50, with respect to power distribution, generally comprises:

a master control device 400A which comprises:
   a PLCC gateway to enable two-way communication with PLCC gateway 91 in control enclosure 40;
   a voltage module which measures voltage at the sub-circuit level similar to voltage module 47 which measures voltage at the main circuit level;
      In the present embodiment, voltage is not measured at the main circuit level; however, this is by way of example and not by way of limitation. Use of voltage module 47 would not prevent use of the voltage modules in control devices 400A.
      FIG. 3B illustrates two possible methods of wiring the voltage module for three-phase power (see reference no. 21).
   a diagnostic module which measures current at the sub-circuit level similar to current measuring module 45 which measures current at the main circuit level;
      In the present embodiment, current at the main circuit level is not measured in the same manner as current module 45 in the state of the art; this is discussed in further detail in the section addressing electrical grounding.
      FIG. 3C illustrates one possible method of wiring the diagnostic module on the common side of its associated ballasts.
   a power monitoring module which calculates power consumption for each sub-circuit based on input from the voltage and diagnostic modules and a power factor, and communicates the calculation to the PLCC gateway;

The power factor is based upon the phase relationship between the measured current and measured voltage which is why both current and voltage measurements are made at the same location; additionally, the measurements are made at the sub-circuit level to provide high resolution data to aid in diagnostics. However, this is by way of example and not by way of limitation; for example, it is possible to determine the power factor when voltage and current measurements are made at different locations if a correction factor for the time delay can be determined.

Power calculations could be performed continuously, on demand, according to a specified sampling rate, or otherwise. Likewise, the power calculations which are communicated to the PLCC gateway could be communicated to control unit 42 continuously, on demand, according to an average over a predetermined time, or otherwise.

a lamp drive circuit which provides a drive current signal to lamp controller/capacitor bank 53/54 in accordance with the command communicated by control unit 42; and Aforementioned U.S. patent application Ser. No. 12/534,504 (U.S. Pat. No. 8,247,990) incorporated by reference herein describes possible lamp drive circuits for the type of lamp controller system illustrated in FIGS. 3A-D.

a light measuring mode (LMM) which coordinates measurements from a sensor 500 to determine light output;

Light output may be directly measured as an absolute value or may be derived from some relationship to a baseline as a relative value.

U.S. patent application Ser. No. 11/963,084 incorporated by reference herein describes possible LMMs and sensor configurations for an outdoor lighting system.

a daughter control device 400B of similar function as master control device 400A for use with additional lighting circuits;

The concept of a master-slave configuration (in this example, for devices 400) to accommodate a plurality of circuits or loads is well known in the art.

a disconnect switch 52; and a TVSS.

In practice, a command is communicated from PLCC 91 in enclosure 40 to the PLCC in master control device 400A in enclosure 50. The lamp drive circuit instructs lamp controller/capacitor bank 53/54 to engage in the necessary actuation (or analogous function depending on the particular switching means) to provide the correct capacitance in the circuit, and therefore, the desired light output. Said command is further communicated to daughter device 400B for subsequent circuits to achieve a similar result.

FIG. 3D illustrates the equipment housed at equipment enclosures 50 and used to power luminaires 61. As can be seen, the envisioned layout differs from the current state of the art in that ballasts 51 are housed in equipment enclosures (see reference nos. 50A and B) separate from capacitor banks 53; this layout yields the following benefits, though is not limited to such:

ease of maintenance (e.g., since components needing similar replacement parts are in the same enclosure);

isolation of ballasts 51 from other electrical equipment (e.g., to reduce heat and potential EMF interference); and factory wiring is simplified (e.g., power wiring for control units do not need to be run through multiple enclosures).

2. Electrical Grounding

As previously stated, some degree of grounding is typically provided for the components of any outdoor electrical system; in this example, via grounding wires 81 and 82, and electrodes 80 and 83. It has also been stated that for systems such as that illustrated in FIGS. 1A-D, current measurements are typically made at the main circuit level within control enclosure 40. What is envisioned in the present embodiment is an improvement to the system using these existing components to provide a reliability feature and a safety feature not currently available.

a. Ground Monitoring System (GMS)

As can be seen in FIGS. 1A-D, grounding wires 81 and 82 and grounding electrodes 80 and 83 provide a low impedance path to ground; however, the path is only uninterrupted if the integrity of all the components is maintained. As one skilled in the art is aware, often corrosion degrades the connection between components (e.g., between electrode 83 and wire 81), components are stolen (e.g., to sell for scrap), or the grounding system is improperly installed (e.g., not enough electrodes are driven into the ground in areas with poor soil conductivity).

To address these concerns, a GMS module 300 is installed in control enclosure 40 (see FIG. 2) which (i) acts as a backplane for the other modules (e.g., GFCI module 200) and (ii) monitors the integrity of the grounding system; U.S. patent application Ser. No. 12/559,863 incorporated by reference herein discusses possible systems for monitoring the integrity of pre-existing grounding components in a lighting system.

This provides a reliability feature in that if GMS module 300 detects a signal or a trend in signals which implies an undesirable impedance in the grounding system, an alarm can be communicated to control unit 42 (and therefore, control center 100) and displayed on site via interface 49. In this manner an owner or user of the electrical system can be notified that, for example, the grounding system was not installed properly or is no longer functioning properly. Further, the system as envisioned provides a tailored approach to ensuring the integrity of the grounding system in that impedance may be measured at a main circuit level, sub-circuit level, or both depending on the placement of toroids (or analogous devices) within the system. Likewise, the data from the one or more toroids or analogous devices may be monitored and communicated to remote center 100 continuously, on demand, or according to some event or schedule.

b. Ground Fault Circuit Interrupter (GFCI) Functionality

An envisioned GFCI module 200 installed in control enclosure 40 (see FIG. 2) measures current much like current measuring module 45 in state of the art systems, but rather than measuring current on each phase of the three-phase power (see reference no. 21), a single current transformer or analogous device envelopes all three phases such that only imbalances in current are detected; U.S. patent application Ser. No, 12/750,377 (issued as U.S. Pat. No. 8,320,089 on Nov. 27, 2012) and U.S. patent application Ser. No. 12/750,387, both of which are incorporated by reference herein, discuss possible GFCI devices for use in a lighting system such as that illustrated in FIGS. 1A-D.

Imbalance in current, often referred to as leakage current, is often indicative of an impending or actual fault condition and so inclusion of GFCI module 200 provides a safety feature in that, in the event of a trend or measured value which nears or exceeds some threshold, an alarm can be communicated to control unit 42 (and therefore, control center 100) and displayed on site via interface 49. In this manner an owner or user of the electrical system can be notified that, for example, the electrical system has been locked out due to electrical shock hazards or that, for example, preventative maintenance is needed to prevent unsafe operating conditions.

3. Light Output

As has been stated, in the current state of the art a lamp control unit 54 is used to execute commands from control unit 42 to facilitate changes in light output of luminaires 61. Envisioned is a light measuring module (LMM) which in conjunction with sensor 500 acts as a feedback loop to ensure commands are executed correctly; aforementioned U.S. patent application Ser. No. 11/963,084 incorporated by reference herein discusses some possible LMM and sensor configurations. Generally, commands from control unit 42 are intended to produce a specific light output in accordance with (i) a defined operating profile (e.g., as downloaded to control unit 42 based on known operating characteristics of lights 61), (ii) user preference (e.g., communicated via interface 49), or (iii) compensation of light losses (e.g., lamp lumen depreciation); though this is by way of example and not by way of limitation.

In practice, a command is communicated from control unit 42 to master control device 400A via PLCC. The lamp drive circuit of device 400A instructs lamp controller/capacitor bank 53/54 to engage in the necessary actuation (or analogous function depending on the particular switching means) to provide the correct capacitance in the circuit; said command is further communicated to daughter device 400B for subsequent circuits. The lamp drive circuit then determines if the capacitor switching was executed properly via the switch status feedback; likewise, the LMM of device 400A determines if the light output adjusted accordingly by comparing the measurement from sensor 500 to an expected value. If either the feedback or the light measurement comparison is undesirable, the lamp drive circuit could send another command to controller 53/54, send a communication back to control unit 42, send a communication to the other modules (e.g., the diagnostic module) to assess the current operating conditions of the sub-circuit, or otherwise. Any information collected from the lamp drive circuit can be communicated to remote central control center 100 to aid in diagnostics or refine the operating profile for the system, for example.

4. Remote Monitoring

As envisioned, remote central control center 100 encompasses many roles. For example, control center 100 monitors a variety of data continuously, in response to an event, on demand, or according to a schedule. Said data can be averaged, compared to baseline values, or otherwise analyzed for a number of purposes; ensuring the reliability of the system and ensuring the safety of persons in proximity to the system are two purposes previously discussed. Another role of remote center 100 is to act as a user interface gateway the functionality of which may generally be characterized according to the following.

A user may, via web, phone, email, or fax, communicate any of following (though not limited to such) with control center 100:
  operating schedules;
  desired light levels;
  schedule overrides;
  reporting preferences; and
  administrative requests (e.g., provide a list of persons permitted to contact remote center 100 with schedule overrides).

Remote central control center 100 may communicate, in real time if desired, operating parameters including, but not limited to:
  operating schedule;
  usage (e.g., hours operated at the high power setting);
  maintenance needs (e.g., scheduling an appointment to remedy a lamp outage);
  energy consumption (e.g., kW);
  efficiency of the system (e.g., measured lumens/measured power consumption);
  operating cost (e.g., energy consumption*usage*local electric rate—U.S. patent application Ser. No. 12/850,334 incorporated by reference herein discusses possible means and methods of calculating operating cost);
  leakage current values; and
  trend reports.

C. Exemplary Method and Apparatus Embodiment 2

An alternative embodiment in accordance with at least one aspect of the invention envisions replacing GFCI module 200 as described in Exemplary Method and Apparatus Embodiment 1 with a leakage monitoring module as described in U.S. patent application Ser. No. 12/833,544 incorporated by reference herein. The leakage current measuring aspect in the present embodiment is similar in function to GFCI module 200, however, the disconnect function is controlled by instruction from control unit 42 or remote central control center 100 (i.e., power disconnect requires input from a user rather than being an inherent feature of the leakage monitoring module). In this exemplary embodiment, the coil control for the contactors can be high voltage (e.g., 240 VAC) and can be controlled from I/O modules in communication with control unit 42 (see reference no. 48, FIG. 2). Alternatively, coil control for the contactors can be directed via selector switches; this would eliminate the need for the switch interface board in user interface 49.

A benefit of the present embodiment is such that system shutdown is not necessarily automatic; for example, if a game is being played on field 70 at night and a leakage current measurement exceeds a threshold, it may not be preferable to terminate power to lights 61 on field 70 immediately (e.g., to preserve player safety). Instead of automatically terminating power, control center 100 could notify a user of field 70 that power will be terminated after a pre-determined time; alternatively, control unit 42 could instruct lamp control unit 54 to slowly reduce power to lights 61.

D. Exemplary Method and Apparatus Embodiment 3

Figure 4:
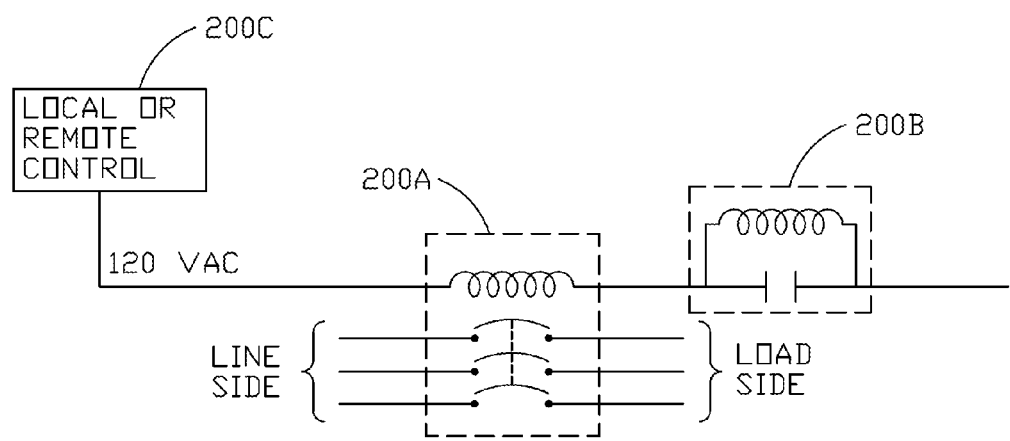
FIG. 4 illustrates GFCI-type functionality according to an alternative embodiment.

An alternative embodiment in accordance with at least one aspect of the invention envisions replacing GFCI module 200 as described in Exemplary Method and Apparatus Embodiment 1 (see FIG. 2) with a GFCI module 200B of similar functionality (see FIG. 4); the difference being that instead of controlling main circuit contactor coil 200 of contactors 41, a GFCI module 200B controls an interposing relay that is electrically connected in series with a contactor coil 200A for each main circuit contactor 41. The interposing relay may be a normally open relay that is closed by GFCI module 200B. If a fault condition is detected, then GFCI module 200B disconnects power to the interposing relay which results in disconnecting power to contactor coil 200A which further results in contacts of contactor 41 disengaging.

A benefit of the present embodiment is such that it is easily retrofitted onto existing electrical systems. For example, if a lighting system already has contactors 41 in place and some form of control (local or remote), then GFCI module 200B may readily be placed in the circuit without modifying the existing contactors 41 (e.g., to adhere to defined response times according to governing codes). GFCI module 200B could receive instruction from the existing control system or could have its own control system 200C (e.g., its own selector switch in an appropriate interface).

E. Options and Alternatives

The invention may take many forms and embodiments. The foregoing examples are but a few of those. To give some sense of some options and alternatives, a few examples are given below.

As described herein, changes in power to the load (in this example, one or more lights 61) are facilitated by switching capacitors in and out of the lighting sub-circuit; however, this is by way of example and not by way of limitation. For example, if the load is a plurality of light emitting diodes rather than a ballasted lamp, then capacitors may be omitted from the circuit and power to the load could be adjusted via a driver-type device in communication with control unit 42.

Figure 5:
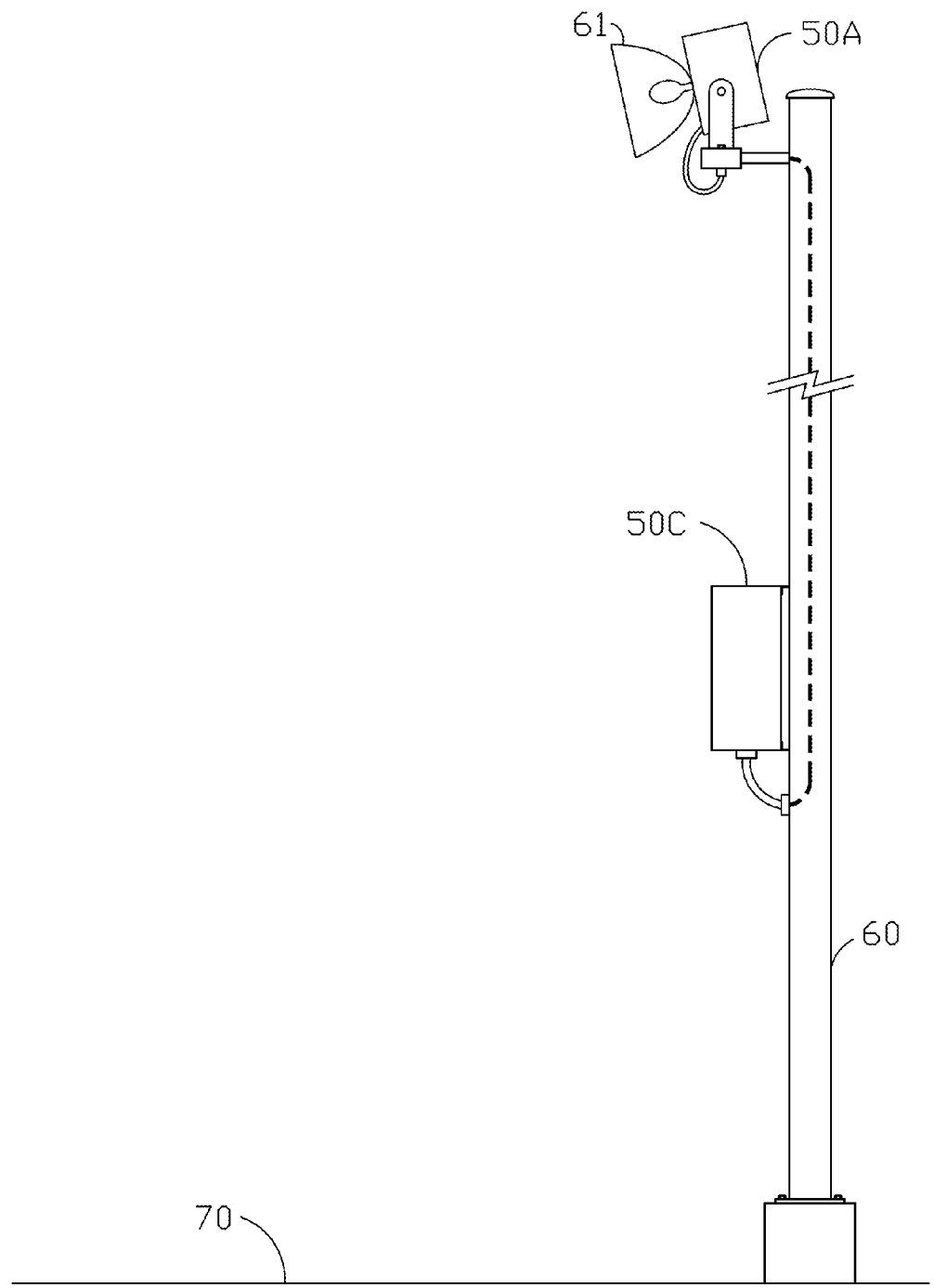
FIG. 5 illustrates implementation of the envisioned control and monitoring system in an alternative lighting system according to an aspect of the present invention.

A variety of devices intended to measure various operating parameters have been described. While the combination of the data provided from the various devices with the capability to manage and analyze the data from a single location is a benefit of the invention described herein, it is of note that the exact layout and number of devices could be different from that described and illustrated herein and not depart from aspects of the invention. For example, GFCI functionality—whether according to Exemplary Method and Apparatus Embodiment 1, 2, or 3—could be located at the sub-circuit level (i.e., at each distributed location) rather than at the main circuit level. This concept could be extended to both current and voltage measurements; measurements could be made at the main circuit level, sub-circuit level, or both depending on the needs of the particular application (e.g., the need to discern between a blown fuse and a lamp outage so to determine an appropriate response). As another example, the layout of devices in enclosures 50 may differ from that illustrated in FIG. 3D; see, for example, FIG. 5 which illustrates an alternative stacking configuration of two enclosures 50A and 50C for a single light 61 affixed to a pole 60. As another example, on/off control could be expanded to include a disconnect switch (see reference no. 52, FIG. 3D) or analogous device for each lighting sub-circuit within an equipment enclosure 50 (e.g., to eliminate the need to run additional power lines 21 to each distributed location), or could be reduced to include only main circuit control (e.g., by eliminating existing disconnect switches 52).

What is claimed is:

1. A method of operating an electrical circuit with one or more high wattage loads comprising:
    a. providing a main circuit connected to a main electrical power source and including one or more contactors;
    b. providing one or more sub-circuits of the main circuit, each sub-circuit electrically connected to electrical power through the one or more contactors of the main circuit and comprising one or more high wattage electrical loads;
    c. the main circuit comprising functionality for:
        i. on and off control of the contactors;
        ii. communication with each sub-circuit;
        iii. monitoring of electrical grounding; and
        iv. monitoring of leakage current;
    d. each sub-circuit comprising functionality for:
        i. adjusting power to each high wattage load;
        ii. monitoring of current and voltage; and
        iii. determining power consumption of each high wattage load.

2. The method of claim 1 further comprising providing a remote central control center, the remote central control center comprising functionality for:
    a. communicating an instruction to the main circuit;
    b. receiving data from the main circuit and the one or more sub-circuits;
    c. analyzing received data;
    d. responding to received data according to one or more defined protocols; and
    e. communicating information pertinent to operation of the electrical circuit to one or more persons associated with the electrical circuit.

3. The method of claim 2 wherein the instruction communicated to the main circuit is based on input from the one or more persons associated with the electrical circuit.

4. The method of claim 1 wherein the adjusting power to each high wattage load is in response to a pre-defined operating profile.

5. The method of claim 1 wherein the electrical circuit comprises a wide area lighting system, wherein the one or more high wattage loads comprise one or more high intensity discharge light sources, and wherein the one or more sub-circuits are spaced apart about a target area.

6. A system for operating an electrical circuit with one or more high wattage loads comprising:
    a. a main circuit connected to a main electrical power source and including one or more contactors;
    b. one or more sub-circuits of the main circuit, each sub-circuit receiving electrical power via the one or more contactors of the main circuit and providing electrical power to the one or more high wattage electrical loads;
    c. one or more electrical grounding circuits each of which includes at least a portion of a sub-circuit in the grounding circuit;
    d. means to selectively provide one or more levels of electrical power to the high wattage electrical loads;
    e. means for measuring and monitoring operating parameters associated with the operation of the high wattage electrical loads to ensure reliable operation;
    f. means for measuring and monitoring parameters associated with the integrity of the one or more electrical grounding circuits; and
    g. means for responding to undesirable trends or values in the measured and monitored operating parameters of the loads and in the measured and monitored parameters of the grounding circuits so to ensure the safety of persons in proximity to the electrical circuit.

7. The system of claim 6 wherein the electrical circuit comprises a wide area lighting system, wherein the one or more high wattage loads comprise one or more high intensity discharge light sources, and wherein the one or more sub-circuits are spaced apart about a target area.

8. The system of claim 6 further comprising a remote central control center in communication with the main circuit, the remote central control center adapted to receive input from persons associated with the electrical circuit and including means to control operating parameters of the high wattage electrical loads in response to the input.

9. The system of claim 6 wherein the means to selectively provide one or more levels of electrical power to the high wattage electrical loads comprises selection of the one or more power levels via a user interface in proximity to and in connection with the main circuit.

10. The system of claim 6 wherein the means for responding to undesirable trends or values in the measured and monitored operating parameters of the loads and in the measured and monitored parameters of the grounding circuits comprises one or more of:
   a. disengaging one or more contactors;
   b. visually and/or audibly indicating an alarm condition to the persons in proximity to the electrical circuit; and
   c. notifying persons associated with the electrical circuit of the alarm condition.

11. A method of monitoring and controlling an electrical system and/or circuits therein comprising:
   a. monitoring at least two operating parameters of the system and/or component(s) or circuit(s) therein wherein one of the operating parameters comprises electrical grounding of the system or a circuit thereof;
   b. processing/analyzing data obtained from the monitoring; and
   c. controlling operation of the system or component(s) or circuit(s) therein in response to the processed/analyzed data.

12. The method of claim 11 wherein the electrical system comprises a wide area lighting system.

13. The method of claim 11 wherein the electrical system comprises high wattage loads distributed about an area.

14. The method of claim 11 wherein one of the operating parameters comprises:
   a. leakage current of a circuit;
   b. voltage across a circuit;
   c. current in a circuit;
   d. power of a circuit;
   e. output of a circuit; or
   f. efficiency of a circuit.

15. The method of claim 11 wherein the processing/analyzing comprises comparison of the data to one or more of:
   a. a defined threshold;
   b. a governing code; and/or
   c. a user preference.

16. The method of claim 11 wherein the controlling comprises one or more of:
   a. adjusting power in a circuit;
   b. identifying an impending undesirable condition;
   c. mitigating a condition;
   d. generating a warning signal or indication;
   e. storing or processing data; and/or
   f. storing operating profiles.

17. The method of claim 11 wherein one or more of the monitoring, processing/analyzing, or controlling is done at least in part remotely from the electrical system.

18. The method of claim 17 wherein the remote monitoring, processing/analyzing, or controlling is accomplished at least in part through a wide area communications network.

19. The method of claim 11 wherein one or more of the monitoring, processing/analyzing, or controlling comprises retro-fitting such functionality to an existing electrical system or component or circuit thereof.

20. The method of claim 11 wherein the monitored operating parameters are compared to a reference and the comparison is used for one or more of the following:
   a. to track one or more operating parameters of the electrical system or a circuit thereof to evaluate if the one or more operating parameters are within a pre-determined range;
   b. to track one or more operating parameters of the electrical system or a circuit thereof over time to evaluate in real time or non-real time the one or more operating parameters and characterize the electrical system or circuit thereof over time and/or in relation to external events or conditions;
   c. to track one or more operating parameters of the electrical system or a circuit thereof over time to evaluate in real time or non-real time the one or more operating parameters and use the evaluation in determining whether a predefined hazardous condition exists;
   d. to track one or more operating parameters of the electrical system or a circuit thereof over time to evaluate in real time or non-real time the one or more operating parameters and predict an out-of-range condition; and/or
   e. to track one or more operating parameters of the electrical system or a circuit thereof over time to evaluate in real time or non-real time the one or more operating parameters and use the evaluation in diagnosing the electrical system or circuit thereof.

21. The method of claim 11 wherein at least two operating parameters are (i) light output produced by the light source measured externally of the light source and (ii) leakage current.

22. The method of claim 21 wherein the light output and the leakage current are measured and compared to a pre-determined reference for each, and wherein the measurement and comparison are made repeatedly over time.

23. An apparatus for monitoring and/or controlling an electrical system and/or circuits therein comprising:
   a. a monitoring sub-system comprising one or more components to monitor one or more functions or parameters of the overall electrical system and one or more component(s) or circuit(s) therein;
   b. a processing sub-system comprising one or more components for processing/analyzing data obtained from the monitoring; and
   c. a controlling sub-system comprising one or more components for controlling operation of the system or component(s) or circuit(s) therein in response to the processed/analyzed data;
   d. wherein the one or more functions or parameters comprise:
      i. leakage current;
      ii. voltage;
      iii. current;
      iv. power;
      v. efficiency or efficacy; and
      vi. electrical grounding.

24. The apparatus of claim 23 wherein the electrical system comprises a wide area lighting system.

25. The apparatus of claim 24 wherein the processing sub-system comprises a component to compare the data to one or more of:
   a. a defined threshold;
   b. a governing code; and/or
   c. a user preference.

26. The apparatus of claim 24 wherein the controlling sub-system comprises one or more of:
   a. a component to adjust power;
   b. a component to identify an impending undesirable condition;
   c. a component to mitigate a condition;
   d. a component to generate a warning signal or indication;
   e. a component to store or process data; and/or
   f. a component to store operating profiles.

27. The apparatus of claim 24 wherein one or more of the monitoring, processing, or controlling sub-systems is in operative communication with a controller which is remote from the electrical system.

28. The apparatus of claim 24 wherein one or more of the monitoring, processing, or controlling sub-systems is retrofitted to a pre-existing electrical system or component or circuit thereof.

29. The apparatus of claim 24 wherein the controlling sub-system comprises a component which allows the interruption of electrical power to the system or a circuit thereof.

* * * * *